United States Patent
Shigematsu

(10) Patent No.: US 7,445,076 B2
(45) Date of Patent: Nov. 4, 2008

(54) DRIVE MOTOR MOUNTING STRUCTURE

(75) Inventor: Satoshi Shigematsu, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 480 days.

(21) Appl. No.: 10/957,694

(22) Filed: Oct. 5, 2004

(65) Prior Publication Data

US 2005/0079068 A1 Apr. 14, 2005

(30) Foreign Application Priority Data

Oct. 9, 2003 (JP) ............................. 2003-351037

(51) Int. Cl.
*B60K 1/00* (2006.01)
*B60K 3/00* (2006.01)
(52) U.S. Cl. .................... 180/299; 180/300; 180/298
(58) Field of Classification Search ................. 180/299, 180/300, 312, 65.3, 232; 209/315, 326; 267/140.12; 248/647, 664, 635, 634
See application file for complete search history.

(56) References Cited

U.S. PATENT DOCUMENTS

| 3,468,418 | A | * | 9/1969 | Renner ........................ 209/315 |
| 4,647,770 | A | * | 3/1987 | Hoffman ................. 250/231.14 |
| 5,435,516 | A | * | 7/1995 | Ogasawara et al. ......... 248/635 |
| 5,718,407 | A | * | 2/1998 | Lee ............................. 248/634 |
| 5,947,226 | A | * | 9/1999 | Bellamy et al. ............. 180/299 |
| 6,116,587 | A | * | 9/2000 | Miyahara ............... 267/140.12 |
| 6,293,364 | B1 | * | 9/2001 | Anderson et al. ........... 180/312 |
| 6,386,309 | B1 | * | 5/2002 | Park ........................... 180/300 |
| 6,494,286 | B2 | * | 12/2002 | Shimizu et al. ............. 180/299 |
| 6,988,579 | B2 | * | 1/2006 | Miyahara ................... 180/299 |
| 6,994,178 | B2 | * | 2/2006 | Mizuno ..................... 180/65.3 |
| 2007/0051549 | A1 | * | 3/2007 | Fukuda ....................... 180/232 |

FOREIGN PATENT DOCUMENTS

JP          8-310252 A       11/1996

* cited by examiner

*Primary Examiner*—Hau V Phan
(74) *Attorney, Agent, or Firm*—Foley & Lardner LLP

(57) ABSTRACT

For spatial arrangement of a drive motor (1) in a motor room (2), a three-point support system (TPS) includes supports (SP1, SP2) having a vibration suppressing member (3) for suppressing vibrations to be transmitted from the drive motor (1), a first bracket (5) for fixing the vibration suppressing member (3) to a transversely inner lateral side (4a) of a side member (4) of a front part (VBf) of a vehicle body, and a second bracket (6) for fixing the drive motor (1) to the vibration suppressing member (3), while the first bracket (5) is fastened to the inner lateral side (4a) of the side member (4), and the second bracket (6) is fastened at a proximal end (6a) to the vibration suppressing member (3) and at a distal end (6b) to the drive motor (1) to be disposed lower than the side member (4), with a reduced vibration transmission from the drive motor (1) to the vehicle body, allowing a facilitated removal of the drive motor (1).

15 Claims, 3 Drawing Sheets

DRIVE MOTOR MOUNTING STRUCTURE

BACKGROUND OF THE INVENTION

1. Field of the Invention

The present invention relates to a drive motor mounting structure, and particularly, to a drive motor mounting structure for vehicles to be driven with a drive motor and provided with a motor room for the drive motor to be mounted therein.

2. Relevant Art

Japanese Patent Application Laid-Open Publication No. 8-310252 has disclosed a mounting structure for mounting a drive motor to a vehicle body in an electric vehicle, in which a motor unit as a drive motor and a control unit therefor, as well as motor auxiliary equipment, are mounted on a single frame for mounting components, to provide a unit assembly, which is installed in a motor room, from thereunder, and mounted in position by using frame-end brackets provided on the component mounting frame and fixed by bolts and nuts to undersides of side members of the vehicle body, body-end brackets provided on upsides of the side members and fixed by bolts and nuts to the frame-end brackets, and a central member provided on a lower part of the motor unit and fixed by bolts and nuts to front and rear cross members of the vehicle body.

This mounting structure enables the drive motor, control unit, and motor auxiliary equipment to be installed in the motor room, all together from under the vehicle, allowing for a great reduction in number of component mounting steps.

SUMMARY OF THE INVENTION

However, in the above-noted mounting structure, the component mounting frame having the drive motor mounted thereon is fixed via brackets to the upsides of the side members, where the areas are too narrow to allow a sufficient provision of anti-vibratory structure, so that it may be difficult to sufficiently attenuate vibrations being transmitted from the drive motor to the vehicle body.

Further, this mounting structure requires the central member to be mounted to the drive motor, this motor to be mounted to the component mounting frame, and this frame to be mounted to the side members, thus needing a commensurate number of additional steps of complicate work in removal of the drive motor.

The present invention is made with such points in view. It therefore is an object of the invention to provide a drive motor mounting structure for vehicles allowing a great attenuation of vibrations being transmitted from a drive motor to a vehicle body, and an enhanced workability in removal of the drive motor.

To achieve the object described, according to an aspect of the invention, a drive motor mounting structure comprises: a motor room defined with side members; and a motor supporting system comprising a plurality of supports cooperative with each other to support a drive motor in a spatial position in the motor room relative to the side members, the motor supporting system including a support comprising a vibration suppressor configured to suppress vibrations being transmitted therethrough, a first support member configured to support the vibration suppressor relative to a lateral side of the side member, and a second support member configured to support the drive motor relative to the vibration suppressor.

According to another aspect of the invention, a drive motor mounting structure for a drive motor to be mounted in a motor room comprises: a vibration suppressing member configured to suppress vibrations being transmitted from the drive motor; a first bracket configured to mount the vibration suppressing member to a transversely inner lateral side of a side member in the motor room, the first bracket being fixed to the lateral side of the side member; and a second bracket configured to mount the drive motor to the vibration suppressing member, the second bracket having one end thereof fixed to the drive motor and an opposite end thereof fixed to the vibration suppressing member, so that the drive motor is disposed under the side member.

BRIEF DESCRIPTION OF THE ACCOMPANYING DRAWINGS

The above and further objects, features, and benefits of the present invention will more fully appear in the following detailed description of the preferred embodiments, when the same is read in conjunction with the accompanying drawings, in which.

DETAILED DESCRIPTION OF THE PREFERRED EMBODIMENTS

There will be detailed below a preferred embodiment of the present invention with reference to the accompanying drawings.

Figure 1:
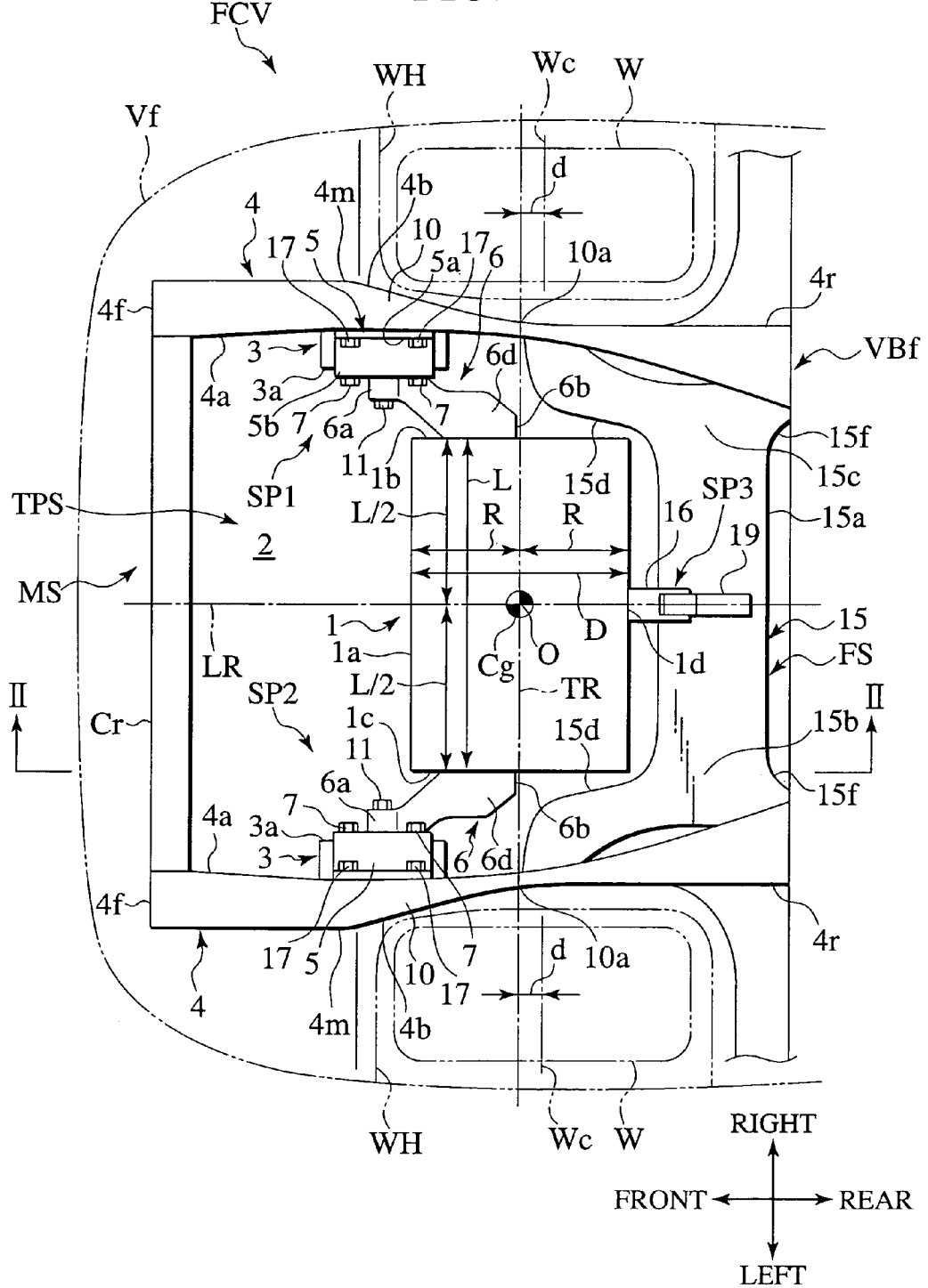
FIG. 1 is a plan of a front part of a fuel cell vehicle including a drive motor mounting structure according to an embodiment of the invention.
Figure 2:
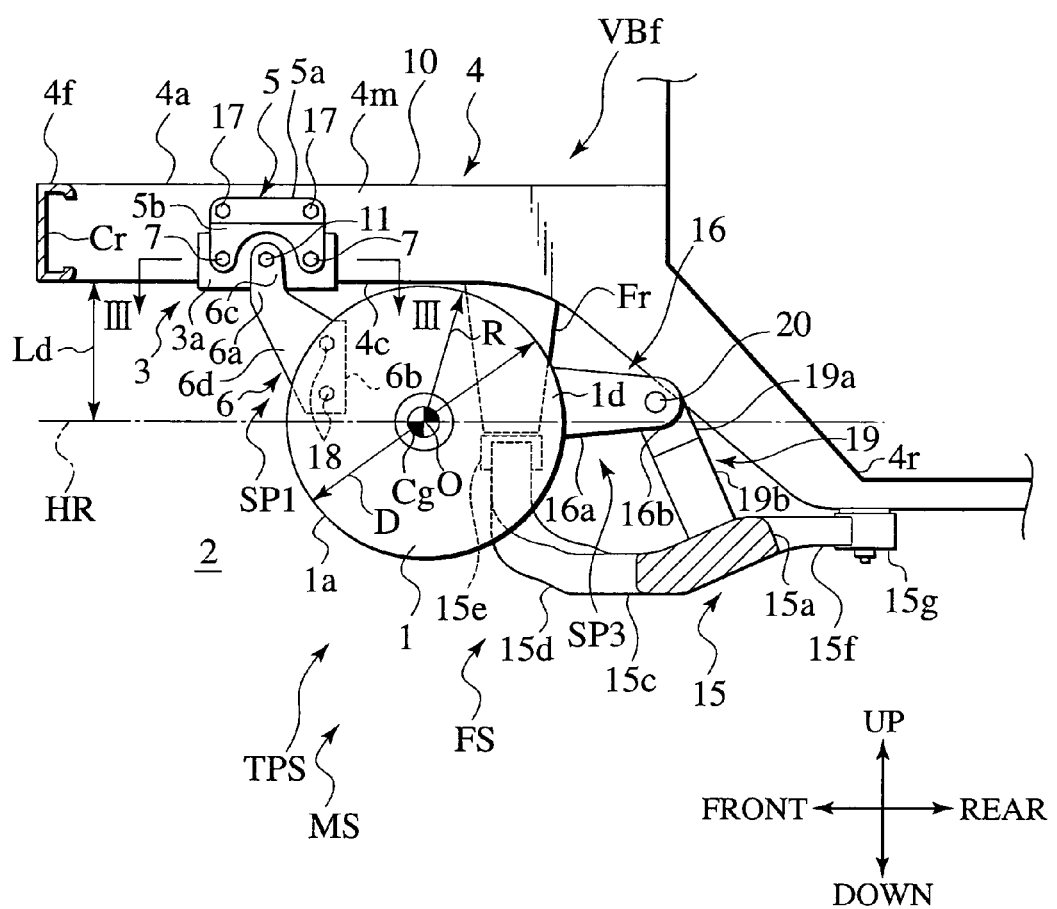
FIG. 2 is a section along line II-II of FIG. 1.
Figure 3:
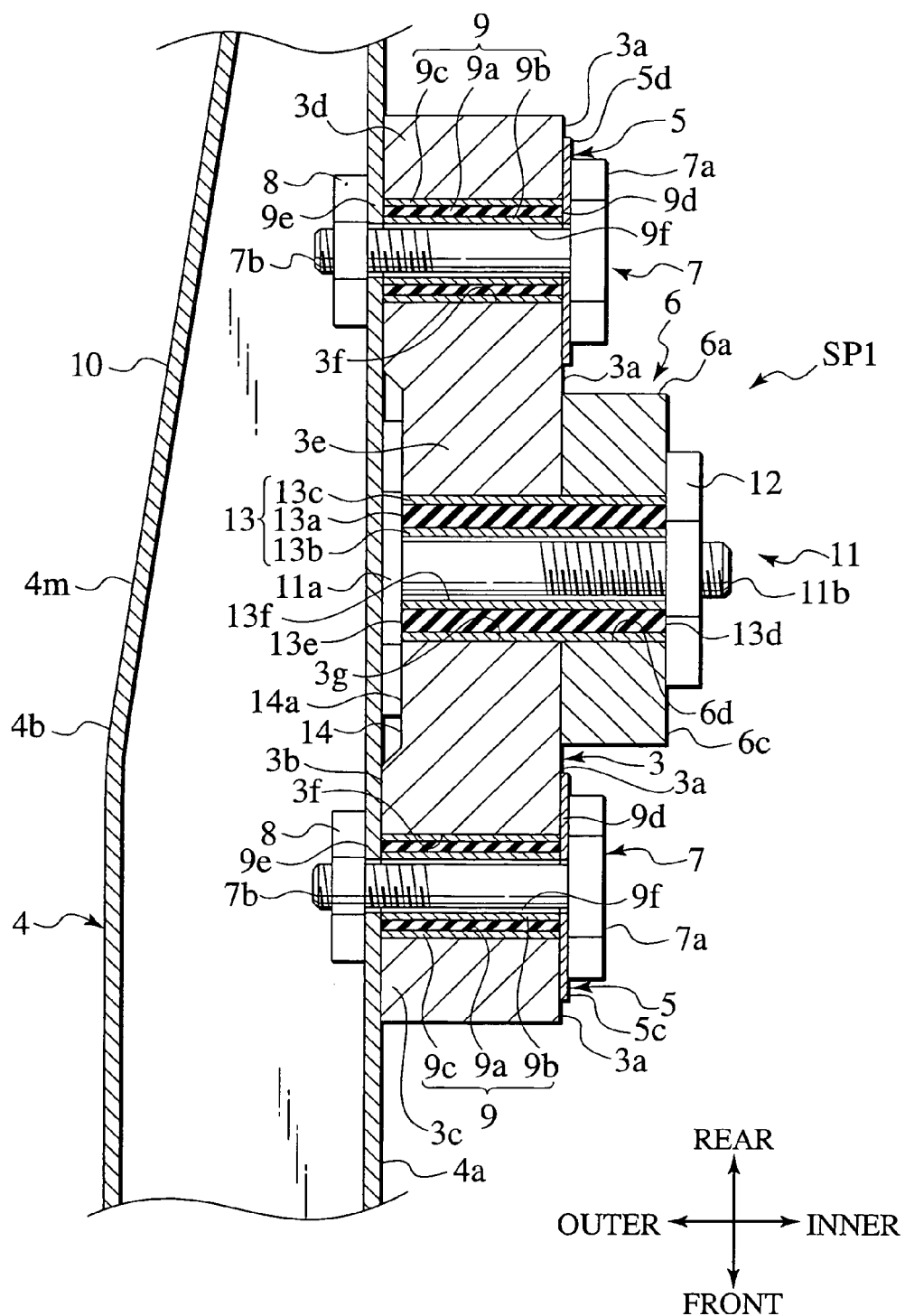
FIG. 3 is a detailed section along line III-III of FIG. 2.

FIG. 1 shows, in plan, a front part Vf of a fuel cell vehicle FCV including a drive motor mounting structure MS according to an embodiment of the invention, FIG. 2 is a section II-II of FIG. 1, and FIG. 3 is a section III-III of FIG. 2.

The fuel cell vehicle FCV has a vehicle body of which a front portion VBf (FIGS. 1-2) includes a pair of vehicle-longitudinally extending rectangular-C-channel-shaped left and right side members 4, 4 (FIGS. 1-3).

The side members 4, 4 are interconnected at their front ends 4f (FIGS. 1-2) by a rectangular-C-channel-shaped cross member Cr (FIGS. 1-2), and at their downwardly slanting rearward extensions 4r (FIGS. 1-2) by a vehicle-transversely extending frame structure FS (FIG. 1-2) including a wheel-suspension-supporting sub-frame 15.

The sub-frame 15 is formed with a straight central portion 15a (FIGS. 1-2), and left and right bifurcate portions 15b (FIG. 1), 15c (FIGS. 1-2). Each bifurcate portion 15b, 15c has a front arm 15d (FIGS. 1-2) fixed via a rubber mount 15e (FIG. 2) to a vehicle body-end frame Fr (FIG. 2), and a rear arm 15f (FIGS. 1-2) fixed via a rubber mount 15g (FIG. 2) to the rear extension 4r of corresponding side member 4.

The bifurcate portions 15b, 15c of sub-frame 15 supports left and right wheel suspensions for independently suspending left and right front wheels W (FIG. 1).

The left and right side members 4, 4 cooperate with neighboring members {e.g. a front bonnet FB (FIG. 1) covering motor room 2, left and right housings WH (FIG. 1) of front wheels W, and a bottom shield extending between the housings WH} to define therebetween a space called "motor room" 2 (FIGS. 1-2), which has a sufficient volume to accommodate therein a vehicle-transversely extending cylindrical drive motor 1 (FIGS. 1-2) which is dimensioned to a diameter D (FIGS. 1-2) by length L (FIG. 1) and has a center of gravity Cg (FIGS. 1-2) at its geometrical center.

A longitudinally intermediate portion 4m (FIGS. 1-3) of each side member 4 is faced at a transversely outer lateral side 4b (FIGS. 1, 3) thereof, to the housing WH of corresponding front wheel W, and has a size-reduced part 10 (FIGS. 1-3) reduced in sectional area or transverse width, where the rigidity is relatively low in the transverse direction.

The drive motor 1 is arranged in a spatial position in motor room 2, so that, as best shown in FIG. 2, an entire circumference of a cylindrical casing 1a (FIG. 1-2) of drive motor 1 is observed under an underside 4c (FIG. 2) of the intermediate portion 4m of side member 4, in side view.

More specifically, the gravity center Cg of drive motor 1 resides on a point of intersection 0 (FIGS. 1-2) among a longitudinally extending vertical reference plane LR (FIG. 1) as a longitudinal center plane of the vehicle FCV, a transversely extending vertical reference plane TR (FIG. 1) forwardly offset at a slight distance d (FIG. 1) from axle centerlines Wc (FIG. 1) of front wheels W, and a horizontal reference plane HR (FIG. 2) extending at a prescribed level that is lower, than the underside 4b of the main portion 4m of side member 4, by a level difference Ld (FIG. 2) slightly greater than a radius R (=D/2: FIGS. 1-2) of the casing 1a of drive motor 1.

The longitudinally extending vertical reference plane LR includes bisectors of cross member Cr and sub-frame 15. The transversely extending vertical reference plane TR passes a most size-reduced region 10a (FIG. 1) of the size-reduced part 10 of each side member 4. The horizontal reference plane HR passes a lower part of the downwardly slanting rearward extension 4r of each side member 4.

For such a spatial arrangement, the drive motor 1 is supported by a three-point supporting system TPS (FIGS. 1-2) including three supports: a front-right support SP1 (FIGS. 1-3) configured to support a right end plate 1b (FIG. 1) of the casing 1a of drive motor 1 relative to the right side member 1 in a vibration controlling manner, a front-left support SP2 (FIG. 1) configured to support a left end plate 1c (FIG. 1) of the drive motor casing 1a relative to the left side member 1 in a vibration controlling manner, and a rear-central support SP3 (FIGS. 1-2) configured to support a rear central part 1d (FIGS. 1-2) of periphery of the drive motor casing 1a relative to the sub-frame 15 in a vibration controlling manner.

As illustrated in FIGS. 1 and 3, the front-right support SP1 as well as the front-left support SP2 is located about a front end of the size-reduced part 10 of intermediate portion 4m of side member 4, so that this part 10 has an increased rigidity in particular in the transverse direction.

The front-left support SP2 has an identical structure to the front-right support SP1, so that this support SP1 and the rear-central support SP3 will be described below.

As best shown in FIG. 2, the front-right support SP1 includes: a vibration suppressing member 3 (FIGS. 1-3) fixed by bolts 7 (FIGS. 1-3) to a transversely inner lateral side 4a (FIGS. 1-3) of the side member 4; a stepped first bracket 5 (FIGS. 1-3) fixed at a base step part 5a (FIGS. 1-2) thereof by bolts 17 (FIGS. 1-2) to the lateral side 4a of side member 4, and at a raised step part 5b (FIGS. 1-2) thereof by the above-noted bolts 7 to a front side 3a (FIGS. 1-3) of the vibration suppressing member 3; and an arm-shaped second bracket 6 (FIGS. 1-3) fixed at a proximal end 6a (FIGS. 1-3) thereof by a bolt 11 (FIGS. 1-3) to the front side 3a of vibration suppressing member 3, and at a distal end 6b (FIGS. 1-2) thereof by bolts 18 (FIG. 2) to the right end plate 1b of the drive motor casing 1a.

The vibration suppressing member 3 is made of a metallic material such as iron and shaped in a rectangular parallelepiped form, for adaptation to shift the frequency of transmitting vibrations, to thereby reduce or attenuate vibrations to be transmitted from drive motor 1 to vehicle body.

As best shown in FIG. 3, the vibration suppressing member 3 is configured to contact at a back side 3b (FIG. 3) thereof on the inner lateral side 4a of side member 4, while the back side 3b is formed with a central recess 14 (FIG. 3) for accommodating therein a head 11a (FIG. 3) of the bolt 11.

The vibration suppressing member 3 has vibration-absorbing front and rear collars 9, 9 (FIG. 3) vehicle-transversely provided through front and rear portions 3c (FIG. 3), 3d (FIG. 3) thereof, respectively. The front and rear collars 9, 9 have their vehicle-transversely inner and outer ends 9d (FIG. 3), 9e (FIG. 3) flush with the front and back sides 3a, 3b of vibration suppressing member 3, respectively, so that the inner ends 9d abut on respective back sides of front and rear bifurcate parts 5c (FIG. 3), 5d (FIG. 3) of the raised step part 5b of first bracket 5, and the outer ends 9e abut on the inner lateral side 4a of side member 4.

The front and rear collars 9 are each respectively formed with: a metallic inner bush 9b (FIG. 3) defining a bolt insertion hole 9f (FIG. 3); a metallic outer bush 9c (FIG. 3) press-fit in a front or rear collar insertion hole 3f (FIG. 3) of the vibration suppressing member 3; and a rubber bush 9a (FIG. 3) fit in and filling a cylindrical gap between the inner and outer bushes 9b, 9c.

The vibration suppressing member 3 further has a vibration-absorbing central collar 13 (FIG. 3) vehicle-transversely provided through a central portion 3e (FIG. 3) thereof. The central collar 13 is vehicle-transversely inwardly extended through the proximal end 6a of the second bracket 6, to be flush at its vehicle-transversely inner end 13d (FIG. 3) with a front side 6c (FIGS. 2-3) of the proximal end 6a of second bracket 6, while its vehicle-transversely outer end 13e (FIG. 3) is flush with a bottom 14a (FIG. 3) of the recess 14.

The central collar 13 is formed with: a metallic inner bush 13b (FIG. 3) defining a bolt insertion hole 13f (FIG. 3); a metallic outer bush 13c (FIG. 3) press-fit in a central collar insertion hole 3g (FIG. 3) of the vibration suppressing member 3 and a collar insertion hole 6d (FIG. 3) of the proximal end 6a of the second bracket 6; and a rubber bush 13a (FIG. 3) fit in and filing a cylindrical gap between the inner and outer bushes 13b, 13c.

The bolts 7 are inserted through the bolt insertion holes 9f of front and rear collars 9, with their heads 7a (FIG. 3) put on the raised step part 5b of the first bracket 5, whereby the first bracket 5 is fastened together with the front and rear portions 3c, 3d of vibration suppressing member 3 to the lateral side 4a of side member 4. The bolts 7 are tightened, together with the first bracket 5 and vibration suppressing member 4, by nuts 8 (FIG. 3) applied to their stems 7b (FIG. 3) from inside the channel-shaped side member 4.

The bolt 11 is inserted through the bolt insertion hole 13f of central collar 13, with the head 11a put on the bottom of recess 14, whereby the central portion 3e of vibration suppressing member 3 is fastened to the proximal end 6a of the second bracket 6. The bolt 11 is tightened, together with the proximal end 6a of second bracket 6 and the vibration suppressing member 4, by a nut 12 (FIG. 3) applied to its stem 11b (FIG. 3) from outside.

The second bracket 6 has an arm portion 6d (FIGS. 1-2) gradually diverged in width, as it extends obliquely downward in the vehicle-longitudinal direction and slightly inward in the vehicle-transverse direction, to have the distal end 6b fixed to the end plate 1b or 1c of drive motor casing 1a by the bolts 18 vertically spaced from each other.

The rear-central support SP3, which has its centerline residing on the longitudinal reference plane LR in plan (FIG. 1) and bent at an angle in side view (FIG. 2), is configured with a horizontal arm-shaped third bracket 16 (FIGS. 1-2)

secured to the drive motor casing 1a, and a forwardly inclined planer support frame 19 (FIGS. 1-2) secured to the sub-frame 15.

The third bracket 16 has a vertically wide proximal end 16a (FIG. 2) joined, by e.g. fastening or welding, to the rear central part 1d of drive motor casing 1a, and a vertically narrowed bifurcate distal end 16b (FIG. 2) connected to an upper end 19a (FIG. 1) of the support frame 19, via a rubber mount 20 (FIG. 2) as a combination of pin and rubber bush disposed at a higher level than the horizontal reference plane HR. The support frame 19 is joined at a lower end 19b (FIG. 2), by e.g. fastening or welding, to the central portion 15a of sub-frame 15.

According to this embodiment, the drive motor mounting structure MS, configured to fix the drive motor 1 in position in the motor room 2, is provided, as shown in FIGS. 1 and 2, with the vibration suppressing member 3 adapted to suppress vibrations to be transmitted from the drive motor 1 to the vehicle body, the first bracket 5 configured to fix the vibration suppressing member 3 to the transversely inner lateral side 4a of side member 4 exposed inside the motor room 2, and the second bracket 6 configured to fix the drive motor 1 to the vibration suppressing member 3.

As described, the vibration suppressing member 3, as a rectangular body made of e.g. iron, is adapted for a function of shifting the frequency of vibrations being transmitted from the drive motor 1 to the vehicle body, to thereby attenuate the vibrations. The vibration suppressing member 3 contacts on such the inner lateral side 4a of vehicle-longitudinally extending side member 4 that vehicle-transversely confronts the motor room 2.

More specifically, as shown in FIG. 3, the vibration suppressing member 3 is fixed to the inner lateral side 4a of side member 4, in a pinching manner by the first bracket 5 using the combination of bolts 7, 17 and their nuts 8 as a fastener. The fixation of vibration suppressing member 4 and first bracket 5 is effected via the combination of collars 9 as a first vibration absorber that partially absorbs vibrations being transmitted from the drive motor 1 to the vehicle body. The collars 9 are each respectively configured as a vibration-absorbing combination of bushes including the bush 9a as a nested cylindrical rubber part for insertion of bolt 7 to the central region (i.e. hole 9f), and the bushes 9b, 9c as metallic parts covering the bush 9a from inside and outside.

The vibration suppressing member 3, fixed to and directly contacting on the inner lateral side 4a of side member 4, is sized to have a sufficient contact area to well exhibit a vibration absorbing function to be secured. By use of the vibration suppressing member 3 sufficiently great in size, the vibrations to be transmitted from drive motor 1 to vehicle body can be well attenuated, with a successful great reduction of transmittable vibrations to the vehicle body end. The vibration suppressing member 4 has buried therein the combination of collars 9 as the first vibration absorber, whereby those vibrations transmittable from the drive motor 1 to the vehicle body can be yet more reduced.

As shown in FIG. 1, the location for the vibration suppressing member 3 to be fixed resides on a surface region of side member 4 near a front end of the housing WH of corresponding front wheel W, where the intermediate portion 4m of side member 4 extends as a size-reduced part 10 that is reduced in sectional area. The size-reduced part 10 has a remarkably reduced width to necessarily avoid interference with a tire of front wheel W, even if the front wheel W is steered at a vehicle-transversely innermost position. The size-reduced part 10, reduced in its own rigidity due to the remarkably reduced width, has a supplemented total rigidity by the combination of vibration suppressing member 4 and first bracket 5 arranged thereon.

The first bracket 5 is sized to be great enough for the sufficiently great vibration suppressing member 4 to be fixed on the inner lateral side 4a of side member 4. The first bracket 5 is formed at its four corners with bolt insertion holes for the bolts 7 and 17 to be inserted therein to fix the vibration suppressing member 3 to the side member 4. Among the bolt insertion holes, upper two serves for the insertion of bolts 17 to effect a direct fastening of bracket 5 to side member 4, and lower two serves for the insertion of bolts 7 to effect an indirect fastening of bracket 5 to side member 4 with the vibration suppressing member 4 in between.

The second bracket 6 serves for fixing the drive motor 1 to the vibration suppressing member 3 fixed to the vehicle-transversely inner lateral side 4a of side member, as illustrated in FIGS. 1 and 2. This bracket 6 is shaped in the form of an arm to have the drive motor 1 disposed under the side member 4, and is fixed at one end (i.e. distal end 6b) directly to the drive motor 1 by adequate elements (e.g. bolts 18 in the embodiment), and at an opposite end (i.e. proximal end 6a) to the vibration suppressing member 3 by fastening elements (bolt 11 and nut 12).

The second bracket 6 and the vibration suppressing member 3 are fixed to each other via the collar 13 as a second vibration absorber that absorbs part of vibrations being transmitted from the drive motor 1 to the vehicle body. Like the collars 9, the collar 13 is configured as a vibration-absorbing combination of bushes including the bush 13a as a nested cylindrical rubber part for insertion of bolt 11 to the central region (i.e. hole 13f), and the bushes 13b, 13c as metallic parts covering the bush 13a from inside and outside. This collar 13 is inserted to both the vibration suppressing member 3 and the second bracket 6, to be buried therein. The bolt 11 has the head 11a accommodated in the recess 14 formed in a side (i.e. back side 3b) of the vibration suppressing member 3 contacting on the inner lateral side 4a of side member 4. This bolt 11 is inserted into the collar 13, which is provided through and buried in the vibration suppressing member 3 and the second bracket 6, and has its screw part (i.e. end of stem 11b) projecting from the collar 13, on which part the nut 12 is screwed.

The drive motor mounting structure MS according to the embodiment has the third bracket 16 provided on the drive motor 1 for mounting the drive motor 1 relative to the suspension-supporting sub-frame 15.

The drive motor mounting structure MS has a doubled anti-vibratory configuration, such that the first bracket and the vibration suppressing member 3 are fixed via the collars 9, and the second bracket 6 and the vibration suppressing member 3 are fixed via the collar 13.

In the drive motor mounting structure MS, the side member 4 has the vibration suppressing member 3 fixed to the inner lateral side 4a by the first bracket 5 using bolts 7, 17 and nuts 8, before introduction of the drive motor 1 provided with the second bracket 6 from below the motor room 2 to fix the proximal end 6a of the second bracket 6 to the vibration suppressing member 3, so that the drive motor 1 is mounted to the vehicle body.

According to the embodiment, in which the vibration suppressing member 3 brought into surface contact with the transversely inner lateral side 4a of side member 4 is fixed thereto by the first bracket 5, the vibration suppressing member 3 is allowed to be great enough in size in comparison with a fixation onto a top side or upside of the side member 4, so that vibrations from the drive motor 1 can be sufficiently attenuated. The drive motor mounting structure MS can thus greatly reduce vibrations to be transmitted from the drive motor 1 to the vehicle body.

In particular, due to a doubled anti-vibratory structure in which the first bracket 5 and the vibration suppressing member 3 are fixed via the collar 9 serving as the first vibration absorber and in which the second bracket 6 and the vibration suppressing member 3 are likewise fixed via the collar 13 serving as the second vibration absorber, the drive motor mounting structure MS can achieve an increased effect in attenuation of vibrations from the drive motor 1 relative to the anti-vibratory effect by the simple use of vibration suppressing member 3.

Moreover, according to the embodiment in which the drive motor 1 is disposed under side members 4 by use of the second brackets 6, the side members 4 are allowed to have auxiliary equipment for motor and the like mounted on their top sides, so that spatial regions of the motor room 2 can be sufficiently utilized.

Further, according top the embodiment in which the second bracket 6 is connected at the proximal end 6*a* to the vibration suppressing member 3 and at the distal end 6*b* to the drive motor 1, removal of this drive motor 1 is facilitated, allowing for greatly enhanced mounting and removal workability of the drive motor 1.

Still more, according to the embodiment in which the first bracket 5 as well as the vibration suppressing member 3 is fixed to the intermediate portion 4*m* of side member 4 that has a size-reduced part 10 reduced in sectional area or width near a front end of the wheel housing WH where the front wheel W is provided, the first bracket 5 as well as the vibration suppressing member 3 is adapted to serve as a reinforcement of the side member 4, giving an enhanced rigidity to the side member 4.

The drive motor mounting structure MS is embodied for installation of a drive motor in a motor room of a fuel cell vehicle using hydrogen as a fuel. However, the present invention is applicable to a wide range of vehicle types having a drive motor, without limitation to the fuel cell vehicle.

The contents of Japanese Patent Application No. 2003-351037 filed on Oct. 9, 2003, from which the priority hereof is claimed, are incorporated herein by reference.

While the preferred embodiments of the present invention have been described using specific terms, such description is for illustrative purposes, and it is to be understood that changes and variations may be made without departing from the spirit or scope of the following claims.

What is claimed is:

1. A drive motor mounting structure comprising:
a motor room defined with side members; and
a motor supporting system comprising a plurality of supports cooperative with each other to support a drive motor in a spatial position in the motor room relative to the side members, the motor supporting system including a support comprising:
a vibration suppressor configured to suppress vibrations being transmitted therethrough, the vibration suppressor comprising a planer anti-vibratory member contacting at a side thereof a lateral side of at least one of the side members;
a first support member configured to support the vibration suppressor relative to the lateral side of the at least one of the side members; and
a second support member configured to support the drive motor relative to the vibration suppressor,
wherein the motor supporting system further comprises:

a first vibration absorber interposed between the vibration suppressor and the first support member; and
a second vibration absorber interposed between the vibration suppressor and the second support member,
wherein both of the first and the second vibration absorbers are provided through the anti-vibratory member.

2. The drive motor mounting structure as claimed in claim 1, wherein
the first support member comprises a bracket configured to hold the anti-vibratory member,
the first vibration absorber comprises a collar provided through the anti-vibratory member, and
the motor supporting system further comprises a fastener provided through the bracket and the collar to fasten the bracket together with the anti-vibratory member to the lateral side of the at least one of the side members.

3. The drive motor mounting structure as claimed in claim 2, wherein the collar comprises a pair of nested metallic bushes and an elastic material inserted therebetween.

4. The drive motor mounting structure as claimed in claim 1, wherein
the second support member comprises a bracket configured to support the drive motor,
the second vibration absorber comprises a collar provided through the anti-vibratory member, and
the motor supporting system further comprises a fastener provided through the collar to fasten the bracket to the anti-vibratory member.

5. The drive motor mounting structure as claimed in claim 4, wherein the collar comprises a pair of nested metallic bushes and an elastic material inserted therebetween.

6. The drive motor mounting structure as claimed in claim 1, wherein
the motor room has a wheel-suspension-supporting sub-frame member connected to the at least one of the side members, and
the motor supporting system further comprises a bracket interposed between the drive motor and the sub-frame member.

7. The drive motor mounting structure as claimed in claim 1, wherein the vibration suppressor is mounted to the lateral side of a size-reduced portion of the at least one of the side members.

8. The drive motor mounting structure as claimed in claim 1, wherein
the motor room is defined with a front wheel housing, and
the vibration suppressor is fixed to a region of the lateral side of the at least one of the side members near a front end of the front wheel housing.

9. A drive motor mounting structure comprising:
a motor room defined with side members; and
a motor supporting system comprising a plurality of supports cooperative with each other to support a drive motor in a spatial position in the motor room relative to the side members, the motor supporting system including a support comprising:
a vibration suppressor configured to suppress vibrations being transmitted therethrough;
a first support member configured to support the vibration suppressor relative to a lateral side of at least one of the side members; and
a second support member configured to support the drive motor relative to the vibration suppressor, wherein
the vibration suppressor comprises a planer anti-vibratory member contacting at a back side thereof on the lateral side of the at least one of the side members, the first support member comprises a first bracket contacting on a front side of the anti-vibratory member, the second support member comprises a second bracket put at one end thereof on the front side of the anti-vibratory member and fixed at another end thereof to the drive motor, and the motor supporting system further comprises:

a vibration absorbing first fastener configured to fasten the first bracket together with the anti-vibratory member to the lateral side of the at least one of the side members; and a vibration absorbing second fastener configured to fasten the one end of the second bracket to the anti-vibratory member.

10. The drive motor mounting structure as claimed in claim 9, wherein the first fastener comprises a bolt, an elastic collar fitted on a stem of the bolt, and a nut.

11. The drive motor mounting structure as claimed in claim 9, wherein the second fastener comprises a bolt, an elastic collar fitted on a stem of the bolt, and a nut.

12. The drive motor mounting structure as claimed in claim 11, wherein the anti-vibratory member has a recess formed in the back side, and the bolt has a head accommodated in the recess.

13. A drive motor mounting structure comprising:

a motor room defined with side members; and a motor supporting system comprising a plurality of supports cooperative with each other to support a drive motor in a spatial position in the motor room relative to the side members, the motor supporting system including a support comprising:

vibration suppressing means for suppressing vibrations being transmitted therethrough, the vibration suppressing means comprises a planer anti-vibratory member contacting at a side thereof a lateral side of at least one of the side members;

first supporting means for supporting the vibration suppressing means relative to the lateral side of the at least one of the side members, and second supporting means for supporting the drive motor relative to the vibration suppressing means, wherein the motor supporting system further comprises:

a first vibration absorbing means interposed between the vibration suppressing means and the first supporting means; and a second vibration absorbing means interposed between the vibration suppressing means and the second supporting means, wherein both of the first and the second vibration absorbing means are provided through the anti-vibratory member.

14. A drive motor mounting structure for a drive motor to be mounted in a motor room, the drive motor mounting structure comprising:

a vibration suppressing member configured to suppress vibrations being transmitted from the drive motor, the vibration suppressing member comprising a planer anti-vibratory member contacting at a side thereof a transversely inner lateral side of a side member in the motor room;

a first bracket configured to mount the vibration suppressing member to the transversely inner lateral side of the side member, the first bracket being fixed to the transversely inner lateral side of the side member;

a second bracket configured to mount the drive motor to the vibration suppressing member, the second bracket having one end thereof fixed to the drive motor and an opposite end thereof fixed to the vibration suppressing member, so that the drive motor is disposed under the side member;

a first vibration absorber interposed between the vibration suppressing member and the first bracket; and a second vibration absorber interposed between the vibration suppressing member and the second bracket, wherein both of the first and the second vibration absorbers are provided through the anti-vibratory member.

15. The drive motor mounting structure as claimed in claim 14, having a doubled anti-vibratory structure comprising:

the first vibration absorber through which the vibration suppressing member is fastened to the first bracket; and the second vibration absorber through which the vibration suppressing member is fastened to the second bracket.

* * * * *